United States Patent [19]

Newell, III et al.

[11] Patent Number: 4,787,555

[45] Date of Patent: Nov. 29, 1988

[54] ENVIRONMENTAL CONTROL SYSTEM WITH CONDITION RESPONSIVE TIMER AND METHOD

[75] Inventors: Alfred T. Newell, III, 324 Redwood, Birmingham, Ala. 35210; E. Lane Nichols, Clearwater, Fla.

[73] Assignee: Alfred T. Newell, III, Birmingham, Ala.

[21] Appl. No.: 97,513

[22] Filed: Sep. 15, 1987

Related U.S. Application Data

[62] Division of Ser. No. 779,509, Sep. 24, 1985, Pat. No. 4,722,475.

[51] Int. Cl.$^4$ ............................................... F23N 5/20
[52] U.S. Cl. ...................................... 236/46 R; 165/12; 307/597
[58] Field of Search .................. 236/46 R; 165/12; 62/231; 307/597; 219/492

[56] References Cited

U.S. PATENT DOCUMENTS

| | | | |
|---|---|---|---|
| 3,406,295 | 10/1968 | Corey | 307/598 |
| 3,461,351 | 8/1969 | Heaslip et al. | 307/598 X |
| 4,384,461 | 5/1983 | Kurtz | 62/231 X |

Primary Examiner—William E. Wayner
Attorney, Agent, or Firm—Potthast & Ring

[57] ABSTRACT

A controller (8) of air conditioning apparatus (18) with a cycle timer (12) for periodically actuating the apparatus (18) irrespective of temperature combined with a thermostat (10) for actuating the apparatus (18) in accordance with sensed temperature and logic circuitry (FIG. 3) for recycling the timer (12) to prevent excessive actuation of the apparatus (18) while ensuring minimum actuation in accordance with sensed conditions. Both the duration of the cycle period and the duty cycle of the timer are selectively variable over a wide range through means of timer circuitry employing dual electronic timers (12a and 12b) which are controlled to operate in a complementary manner.

12 Claims, 2 Drawing Sheets

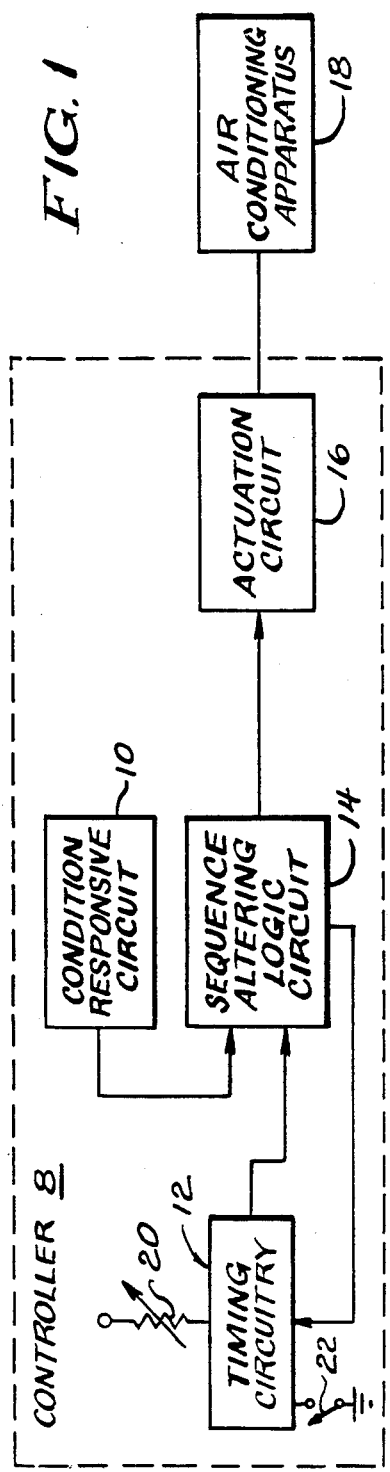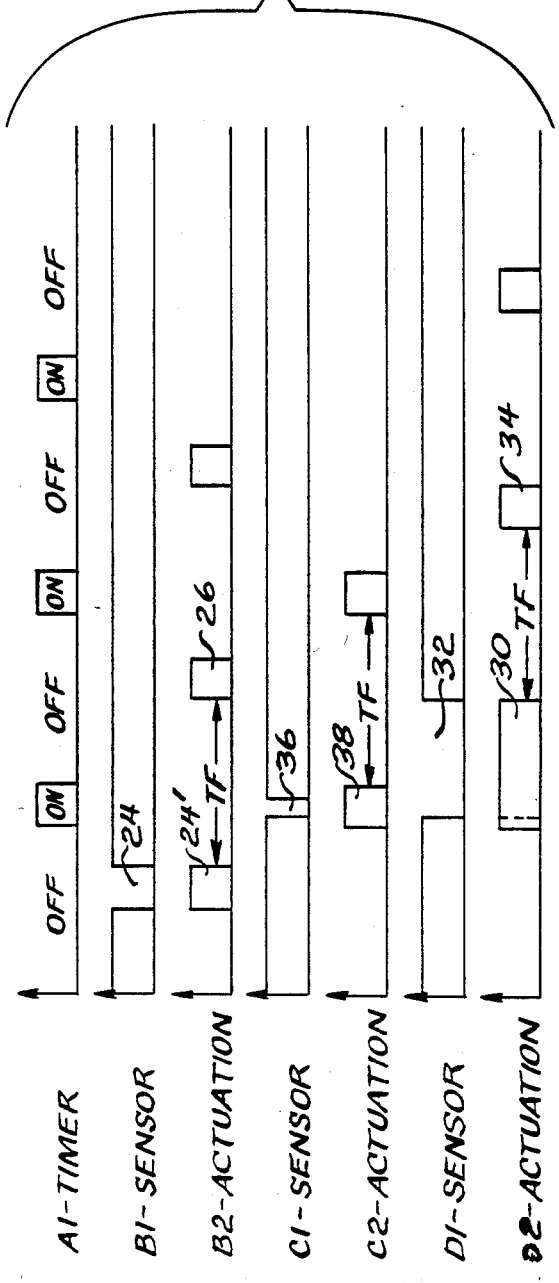

ENVIRONMENTAL CONTROL SYSTEM WITH CONDITION RESPONSIVE TIMER AND METHOD

This application is a division of application Ser. No. 779,509, filed Sept. 24, 1985, now U.S. Pat. No. 4,722,475.

BACKGROUND OF THE INVENTION

This invention relates to an environmental control system, and, more particularly, to such a system with air conditioning apparatus controlled in accordance with both the condition of the environment being controlled and a predetermined timing sequence.

A common method for controlling the temperature within enclosures for growing birds, pigs or cattle has been to use temperature responsive thermostats, such as the type that employs Freon or other gas filled coils which expand or contract to actuate or deactuate air conditioning apparatus, such as ventilation louvers. Electronic thermostats for performing this condition responsive control are also known. Examples of these are shown in U.S. Pat. No. 4,535,601 of Newell Jr. et al. entitled "Environmental Control System", filed Feb. 28, 1984, in U.S. Pat. No. 4,632,304 of Newell III et al. entitled "Electronic Thermostat", filed Feb. 28, 1984 and in U.S. Pat. No. 4,534,406 of Newell III et al. entitled "Thermostat", filed June 28, 1984, all of which are assigned to the assignee of the present application.

It is also known to use a cycle timer switch in combination with the gaseous tube-type thermostats which periodically actuate the air conditioning apparatus for a preselected portion of each preselected timing cycle. The duration of each cycle, or cycle period, and the portion of each cycle that the cycle timer switch actuates the air conditioning apparatus, or duty cycle, is selectively varied according to the age of the birds or other animals within the enclosure. This is necessary to optimize growth and health and to compensate for increase in body heat and other factors as the animals increase in size.

In the known control systems which employ cycle timers in combination with condition responsive controllers, actuation of the air conditioning apparatus by the cycle timer switch is completely independent of actuation by the condition responsive controller. Unfortunately, it is therefore not uncommon that the cycle timer will cause actuation of the air conditioning apparatus immediately after the end of actuation by the condition responsive controller. This results in excessive actuation of the air conditioning apparatus that causes energy waste and erratic and excessive temperature shifts.

Despite this problem, in the case of ventilation apparatus, the cycle timer switch control is considered necessary despite this problem to ensure adequate minimum ventilation. Guaranteed adequate minimum ventilation is needed for several reasons. In order to ensure safety and good health for the animals and workers in the enclosure, the gases and moisture caused by the products from combustion of otherwise unvented heating means and moisture and noxious gases produced from droppings and other litter must be eliminated and fresh oxygen replenished. During warm periods, it is also necessary to eliminate excess heat.

It is known in other types of environments to control condition responsive operation in accordance with a preselected timer sequence. For instance, in U.S. Pat. No. 4,431,130 of McInnes, a timer is used to disable a radiant heat selector for a preselected time period. Likewise, in U.S. Pat. No. 4,290,480 of Sulkowski, the operation of a multiphase environmental control system may be time sequenced to reduce performance on weekends.

While these known timers have been used in other environments to good advantage, they fail to overcome the disadvantages of known controllers for animal enclosures, as noted above. They lack a full range of control over the relative duration of actuation during each cycle period. Moreover, none of these ensure a minimum amount of actuation without reference to sensed conditions. They therefore fail to offer solutions to the problem of ensuring such minimum actuation while preventing excessive time sequenced actuation. As partly noted above, excessive actuation is wasteful of energy, interferes with accurate control of the environment, and has possibly harmful effects on the birds or other animals within the controlled environment.

SUMMARY OF THE INVENTION

Accordingly, it is the principal object of the present invention to provide an environmental control system which overcomes the aforementioned problems of combined condition responsive and time sequenced control of air conditioning apparatus and a method of employing same.

This objective is achieved through provision of an environmental control system having apparatus for conditioning the air within an environmentally controlled space with an improved controller. The improved controller controls actuation of the air conditioning apparatus in accordance with both the sensed condition of the environment and a preselected timing sequence. However, unlike known systems, the time sequence actuation cycle is altered in response to the sensed condition to prevent excessive actuation while a minimum amount of actuation is still ensured.

In a preferred embodiment of the environmental control system, an improved controller for the air conditioning apparatus is employed. This improved controller comprises means to control actuation of said apparatus in accordance with a preselected timing sequence, means for controlling actuation of the apparatus in response to the condition of the air and means responsive to the condition of the air for altering the timing sequence of the timing control means to minimize excessive combined total actuation by both said timing sequence control means and said condition responsive controlling means. The unaltered sequence is a periodic sequence, and the timing control means includes means for actuating the apparatus during a preselected portion of each period. Included are means for reinitiating the cycle period in response to a preselected condition occurring other than during said preselected portion.

It is also an object of the present invention to provide such an environmental control system with means for selectively changing the relative duration of each of said one and the other portions of the cycle relative to the total cycle time period, or the duty cycle. The duty cycle may be changed automatically or manually in accordance with a preselected sequence based on the animal's growth patterns.

A further objective is provision of a controller for such an environmental control system in which the duration of the total period may be selectively changed independently of any change to the aforementioned duty cycle.

Accordingly, a new method of controlling an air ventilation system of an agricultural building or the like is provided comprising the steps of establishing periodic timing cycles, actuating the ventilation system for a preselected portion of each of said time periods, sensing the condition of the air within the building, establishing a preselected condition of the air within the building, establishing a preselected time period for each cycle, and causing the establishing means to interrupt a current timing cycle and begin a new timing cycle in response to the sensed condition assuming the preselected condition within the preselected time period.

It is also an object to provide a system with a timing controller in which the actuation portion of each cycle period is selectively variable over a full range. This objective is achieved, in part, through provision of an improved timing controller of the apparatus comprising a pair of cycle timers, means for complementarily varying the duty cycle of both of the timers with a single control and means for actuating the apparatus during a preselected portion of the cycle of one of the timers. Because of this unique arrangement, the duty cycles may vary over substantially the full 100% range of possible control. cl BRIEF DESCRIPTION OF THE DRAWINGS The foregoing objects, features and advantages of the invention will be described in detail and others will be made apparent from the following detailed description of the preferred embodiment which is given with reference to the several figures of the drawing, in which:

FIG. 1 is a functional block diagram of the environmental control system of the present invention;

FIG. 2 is a series of waveforms illustrating the relationship between various signals generated by the controller of FIG. 1.

DETAILED DESCRIPTION

Figure 3:
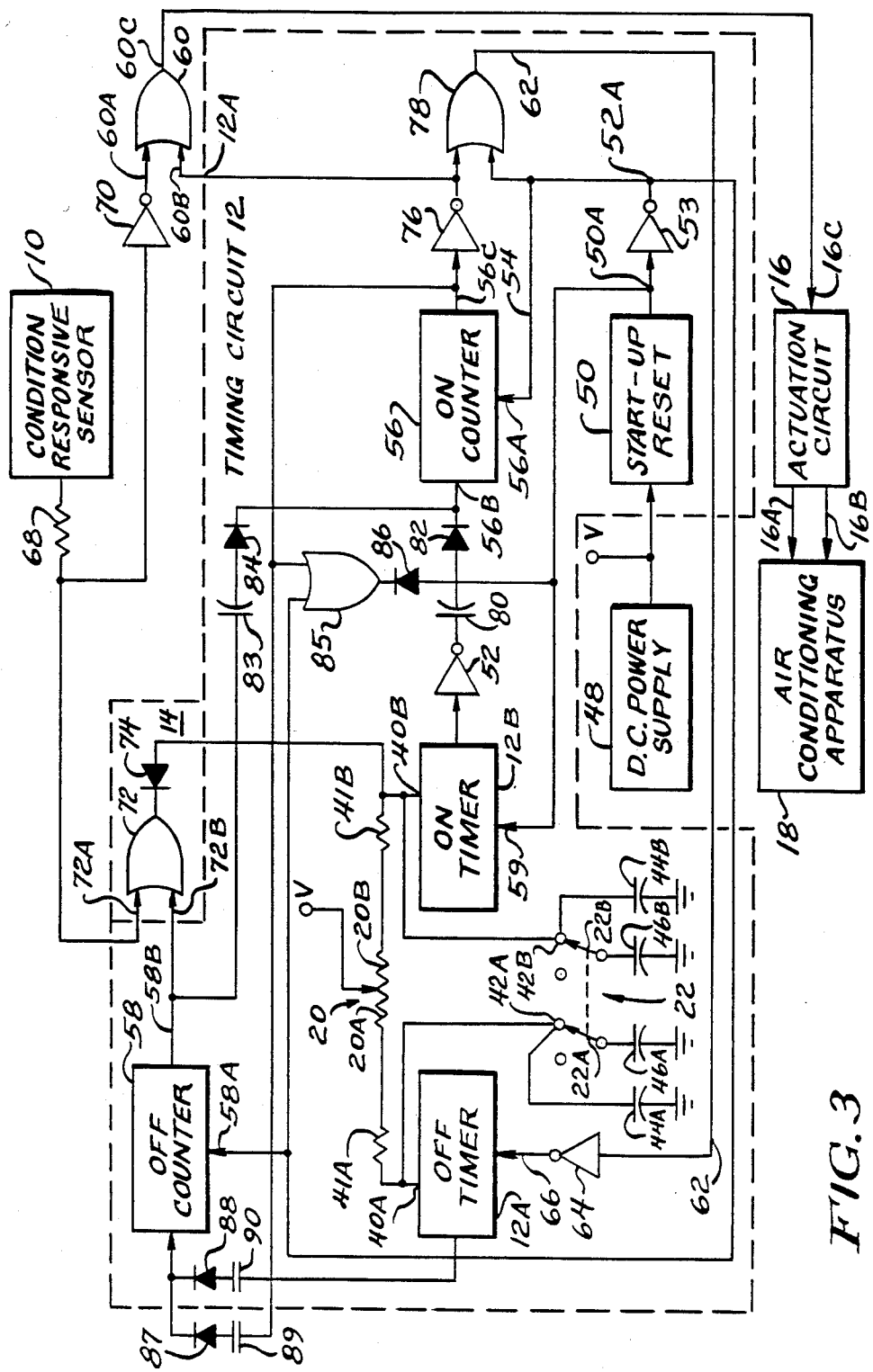
FIG. 3 is a detailed circuit logic diagram of a preferred circuit implementation of the functional block diagram of FIG. 1.

Referring to FIG. 1, the controller 8 is a condition responsive timer and thus includes both a condition responsive circuit 10 and a timing circuit 12. A sequence altering logic circuit 14 receives signals from both the condition responsive circuit 10 and the timing circuit 12. The logic circuit 14 provides output signals to an actuation circuit 16 in response to a call for actuation from either of circuits 10 or 12 and provides feedback signals to timing circuit 12.

The actuation circuit 16 of the controller is connected to control the actuation of an air conditioning apparatus 18. The feedback signals, on the other hand, are employed to reset and disable the timing circuit 12 depending upon the condition of its output relative to that of the condition responsive sensor 10.

Preferably, the timing circuit 12 has means for selectively varying the duty cycle, such as a potentiometer resistor 20. The duty cycle is preferably continuously variable between substantially a zero percent duty cycle to substantially a hundred percent duty cycle depending upon the setting of the potentiometer resistor 20. Each cycle commences with a deactuation, or an off, portion and ends with an actuation, or an on, portion.

It is also preferred that means, such as a cycle time selection switch 22, is provided to selectively establish different timing cycle time periods. In one position, such as the open position shown in FIG. 1, a cycle time period of five minutes, for instance, is selected while in a closed position, the timing circuit 12 has a ten minute cycle time period. Other periods up to thirty minutes or more are also obtainable, as will be made apparent by reference to FIG. 3.

The condition responsive circuit comprises any appropriate sensing apparatus for sensing the condition of the air of the controlled space associated with the air conditioning apparatus, such as its humidity, temperature or a combination of both and providing a binary electrical output signal indicative of same. The condition sensed is compared to a preselected condition, such as a set temperature. When the sensed temperature corresponds to the preselected temperature, then the condition responsive circuit 10 produces a sensor signal, such as a 0-state signal shown in FIGS. 2-B1, 2-C1 and 2-D1, which is applied to the input of the logic circuit 14 to indicate same. The generation of such a sensor signal causes the controller 8 to actuate the air conditioning apparatus which then alters the condition of the air in the controlled space associated therewith.

The condition responsive sensor 10 is preferably provided with a hysterisis characteristic. Accordingly, the sensor signal continues until the sensed condition assumes another preselected value different from the original preselected value associated with initial actuation of the air conditioning apparatus.

The particular details of the condition responsive sensor form no part of this invention. However, reference may be made to U.S. Pat. No. 4,535,601 of Newell Jr. et al. entitled "Environmental Control System", filed Feb. 28, 1984, to U.S. Pat. No. 4,632,304 of Newell III et al. entitled "Electronic Thermostat", filed Feb. 28, 1984, and to U.S. patent application Ser. No. 625,606 of Newell III et al. entitled "Thermostat", filed June 28, 1984, for details of a suitable circuit to use as the condition responsive sensor 10. However, with respect to the preferred circuitry for implementation of the logic circuit 14 and the actuation circuit 16, a detailed description is provided below with reference to FIGS. 2 and 3.

The air conditioning apparatus 18 combined with the controller 8 forms a complete environmental control system. Preferably, the air conditioning apparatus is a louvered ventilation system which increases ventilation when actuated, such as shown in the aforementioned patent application Ser. No. 584,387. Alternative cooling apparatus includes condensive cooling apparatus and fans. In such case, actuation of the air conditioning apparatus causes the temperature to drop, and once it has dropped to a preselected deactuation temperature which is less than the actuation temperature, the sensor actuation signal is terminated. In the case of the air conditioning apparatus being a heater, the sensor deactuation temperature is greater than the preselected actuation temperature. The air conditioning apparatus may also include humidifiers, dehumidifiers, and water spraying and other evaporative cooling systems or any combination of these.

The relationship between the timing signal from timing circuit 12, the sensor signal from condition responsive circuit 10 and the actuation output signal is from actuation circuit 16 illustrated in FIG. 2. These signals illustrate an 80% duty cycle of the cycle timer, in which case there is no actuation called for until the last 20% of the cycle period. The figures of FIGS. 2-B1, 2-C1 and 2-D1 represent different sensor signals and FIGS. 2-B2, 2-C2 and 2-D2 represent the corresponding actuation signals, respectively, presuming a normal, non-altered, timer signal as shown in FIG. 2-A1.

When a 0-state sensor signal of FIG. 2-B1 or FIG. 2-D1 is generated during the off period of the unaltered timer signal of FIG. 2-A, then a 1-state actuation signal is generated, as shown in FIG. 2-B2 and FIG. 2-D2, respectively. At the end of the sensor signal 24, the timing circuit 12 is recycled or reset. When reset, the next actuation pulse 26 does not occur when it would if there were no sensor signal 24, as shown in FIG. 2-1A. Instead, it does not begin until the end of a complete off period TF of the duty cycle, as shown in FIGS. 2-B2 and 2-D2.

If sensor actuation signal 24 both starts and stops during an off period, as shown in FIG. 2-B1, then an actuation signal 24' will be generated during this same time period.

If the sensor signal 24 commences during the on portion of the duty cycle and continues beyond the end of this on portion of the timer signal of FIG. 2-A1, as shown in FIG. 2-D1, then the actuation signal 30 commences with the on portion of timer signal of FIG. 2-A1 and continues until the end of the 0-state sensor signal 32, as shown in FIG. 2-D2. At the end of the sensor signal 32, the timer cycle again begins, or is recycled, and an actuation signal 34 is generated at the end of a full off period TF of the timer cycle, as shown in Fig. D2.

If the sensor signal both begins before and ends after the on portion of a timer signal, then the actuation signal 30 coincides with the sensor signal. At the end of the sensor signal, the timer commences a new cycle and the next actuation signal is generated in response to the sensor signal at the end of a full off period TF, in the same manner, as shown in FIG. 2-D2.

If a sensor signal 36 begins after the start of a timer signal of FIG. 2-A and ends before the end of the timer signal, as shown in FIG. 2-C1, then the actuation signal 38 is uneffected and continues the same as if the sensor signal did not occur, as shown in FIG. 2-C2.

Referring now to FIG. 3, a detailed functional block diagram and circuit logic diagram of a preferred embodiment of the controller 8 of FIG. 1 is shown. When the temperature gets warmer, then the sensor signal will increase in duration, such as the sensor signal actuation pulse, or ON pulse, 32 of FIG. 2-D1 is increased relative to sensor signal pulse 36 of FIG. 2-C1 or relative to the pulse 24 of FIG. 2-B1. In such case, the actuation period of actuation circuit 16 of FIG. 3 is increased and cooling is increased. The timing circuit 12 includes an off timer 12A and an on timer 12B which may be substantially identical to one another and which function in a complementary fashion. Use of conventional integrated circuit timers, such as an LM 555 or LM 556 made by National Semiconductor have been found suitable for this function.

Each has a control input 40A and 40B which are connected to the junctions 42A and 42B, respectively, at the opposite sides of a potentiometer resistor 20 and a cycle selection switch 22. Cycle selection switch 22 has two sections 22A and 22B respectively associated with a pair of capacitors 44A and 46A and a pair of capacitors 44B and 46B. These capacitors are connected between opposite sides of their associated switch section and ground.

When the switch 22 is in the closed position, as shown in FIG. 3, then the total capacitance of both associated capacitors is connected with the potentiometer resistor 20 and the associated control input to establish a first cycle time period on the order of sixty seconds for the associated timer. When the switch 22 is in an open position, capacitors 46A and 46B are disconnected from the potentiometer. This reduces the total capacitance connected with the potentiometer and thereby reduces the associated RC time period and the cycle time of both timers 12A and 12B.

The potentiometer slide contact is connected with a positive DC power supply voltage V obtained from a DC power supply 48. When power is first applied, the capacitors 44A and 46A begin to charge to voltage V through the associated section 20A of potentiometer resistor 20, and a relatively small current limiting resistor 50A. Resistor 50A has a value which is less than one percent of that of the potentiometer resistor 20, so that an approximately 100% range of control of duty cycle is obtainable. Likewise, when power is first applied, capacitors 44B and 46B are charged through the associated section 20B of potentiometer resistor 20 and a limiting resistor 50B.

As noted above, the off timer 12A and on timer 12B operate in a complementary fashion. This is achieved through the symmetrical and common connection of the potentiometer with both timers. This connection is symmetrical since all the corresponding circuit elements associated with opposite sides of the potentiometer resistor 20 are equal to one another.

Capacitors 46A and 46B are equal to one another and in one embodiment have a capacitance value on the order of 6.8 microfarad and capacitors 44 and 44B are of equal value on the order of 8.3 microfarads. Likewise, resistors 41A and 41B are of equal value of approximately ten kilohm. Potentiometer resistor has a value on the order of five megaohms which is one hundred times larger than the total of limit resistors 50A and 50B.

The total of the time constants of the two RC circuits respectively associated with the on and off timers 12A and 12B remains constant and is established solely by the value of the capacitors and the total value of the three resistors 50A, 20 and 50B. This value does not change with changes in the potentiometer setting.

However, the individual RC time constants of off timer 12A and on timer 12B, which determine the duty cycle, vary with variations in the potentiometer setting. They are therefore linearly related to one another. As the time constant of one increases by a given percentage of the total time constant, the other decreases by that same percentage.

When the potentiometer is set at the center of the potentiometer, as shown, then resistor portions 20A and 20B are equal and the two RC timer constants are equal. Accordingly, a 50% duty cycle will be established. However, for purposes of discussion, it will be presumed that the potentiometer slider is at a 20% duty cycle setting and the cycle time selection switch has been set for a five minute cycle time. In that event, in a normal, uninterrupted cycle, the cycle timer will place the air conditioning apparatus in a deactuated state for the first 80% of the total cycle time, i.e., for the first four minutes of the five minute cycle. It will then cause the apparatus to assume an actuated state for the next remaining 20% of the cycle period, or for one minute. This cycle will then be repeated.

Initially, both timers 12A and 12B are reset by a reset circuit 50 which maintains a 0-state reset signal on its output 50A for a preselected time period after DC power voltage V is applied to the remainder of the controller circuit. Preferably, it comprises a single RC time delay circuit connected between supply voltage V and ground reference potentiometer.

This 0-state reset pulse is used to reset the timers 12A and 12B and two counters, or dividers, off counter 56 and on counter 58 respectively associated therewith. First, a 0-state reset pulse is applied directly to a reset input 59 of on timer 12B. This pulse is also inverted by an inverter. 53 to produce a 1-state reset pulse on its output 52A. This 0-state reset pulse is applied via a connection lead 54 to a reset input 56A of the on counter 56. It is also applied to the reset input 58A. This 1-state reset pulse is also applied to an input of a logic OR-gate 78. The OR-gate 78 responds by producing a 1-state reset pulse on its output which is applied via a connection 62 to the input of an inverter 64. Inverter 64 inverts this to a 0-state reset pulse which is applied to a reset input 66 of off timer 12A.

In this reset condition, all the circuitry of controller 8 is in a condition which causes the air conditioning apparatus 18 to be in a deactuated state. The details of the actuation circuit form no part of the present invention, and reference may be made to the aforementioned U.S. patent application Ser. No. 584,398 for details of suitable circuitry useful for this purpose. Briefly, the the actuation circuit 16 has a relay or electronic switch which closes to short circuit a pair of output terminals 16A and 16B in response to a 1-state signal at its input 16C. This shorting of the output terminals causes actuation of the air conditioning apparatus 18 connected therewith. In the case of an automatic ventilation system, ventilation would be increased upon being actuated as compared to when deactuated.

The logic actuation signal applied to the input 16C of the actuation circuit is taken from the output 60C of a logic OR-gate 60. OR-gate 60 generates a logic 1-state actuation signal whenever either of its inputs 60A and 60B is in a 1-state. One of the inputs 60A is taken from the condition responsive sensor 10 via a resistor 68 and an inverter 70. The other input is taken from the output 12C of timing circuit 12. Thus, whenever either the condition responsive sensor 10 calls for actuation through generation of a 0-state sensor signal or the timing circuit calls for actuation through generation of a 1-state timer actuation signal on its output 12A, a logic 1-state actuation signal is generated on the output 60C of OR-gate 60.

The sequence altering logic circuit includes a logic OR-gate 72 having one input 72A connected to the output of the condition responsive sensor 10 through the resistor 68. The other input 72B is connected to the output 58B of the off counter 58 of timing circuit 12, and the output 72C is connected to the junction 42B of resistor 50B and capacitors 44B and 46B through means of a diode 74.

Thus, whenever both a 0-state sensor signal is being generated and a 0-state off counter output signal is being generated, the output of OR-gate 72 will switch to a 0-state sequence alteration signal. Whenever this alteration signal is generated, it causes the capacitors 44A, 46A, 44B and 46B to be discharged to ground reference potential through the diode 74. This disables the on counter 12B from generating further 1-state output pulses to trigger on counter 56. Accordingly, the count of on counter 56 remains the same and its output remains in the off 1-state condition. This output is inverted to a 0-state by an inverter 76 and then applied to the input of an OR-gate 78. The resultant 0-state output signal from OR-gate 78 is first inverted to a 1-state signal by inverter 64 and then applied to the reset input 66 of off timer 12A. The off timer 12A is thereby reset and when the condition responsive signal is terminated the timing cycle is begun anew.

For purposes of timing, a trigger pulse is also applied to trigger input 56B of the on counter 56 from the output 58B of off counter 58 through an AC coupling capacitor 83 and a diode 84. Likewise, the output of on counter 56 is connected to off counter 58 through a capacitor 89 and diode 87, while the output of off timer 12A is coupled to the input of off counter 58 through a capacitor 90 and a diode 88.

A further feature of the invention is an anti-lock-up circuit which includes an OR-gate 85 to generate appropriate reset pulses. The OR-gate has its output connected through an isolation diode 86 to the reset input 59 of on timer 12B. It is also connected to the start-up reset output 50A at the juncture with inverter 52 to apply a reset pulse to on counter 56, off counter 58 and off timer 12A, as previously explained with reference to operation of the start up reset circuit 50. Thus, when the output of OR-gate 85 generates a 0-state reset pulse, all counters and timers are reset and operation resumes in the same way as when power is first applied, as described above.

The OR-gate 85 has two inputs. One input is taken from the output 52A of inverter 52 to receive signals from start-up reset circuit. The other input is taken from the output 56C of on counter 56.

The anti-lock-up circuit operates to prevent a lock-up of all circuits which could result from a noise pulse causing both the on counter 56 and the off counter 58 to be on at the same time. If this occurs, then lock-up condition is sensed by the OR-gate 85 which generates 1-state anti-lock-up pulse on its output. This anti-lockout pulse then resets all the circuits as described above, so that normal operation can resume.

While a preferred embodiment has been disclosed for purposes of illustration, the scope of the invention is not so limited, but instead is defined in the following claims. For instance, while in the particular embodiment, the timer is disabled from actuating the air conditioning apparatus for a period to time equal to its off cycle period, such disablement period could last longer if desired.

We claim:

1. In an environmental control system having apparatus for conditioning the air within an environmentally controlled space, an improved time controller of the apparatus comprising:
   a pair of cycle timers;
   means for complementarily varying the duty cycles of both of said timers with a single control, manual movement of said control increasing the duty cycle of one of said timers and substantially reducing the timing cycle of the other by a substantially equal amount relative to the total cycle period; and
   means for actuating the apparatus during a preselected portion of the cycle of one of said timers.

2. The system of claim 1 including means for substantially selectively changing the effective value of capacitors connected with said pair of timers by substantially equal amounts to change their cycle periods by equal amounts.

3. The system of claim 2 in which said cycle period changing means includes a double sectioned switch connected with said capacitors.

4. The system of claim 1 including means for disabling at least one of said timers in response to sensed condition of the space.

5. The system of claim 1 in which
said cycle timers alternately change between opposite states, and
the respective states of said pair of cycle timers during normal operation have a preselected relationship with one another.

6. The system of claim 5 including an anti-lock-up circuit for preventing said timers from remaining in respective states which are not in said preselected relationship with one another.

7. The system of claim 6, in which said anti-lock-up circuit comprises
means for detecting when the cycle timers are in other than said preselected relationship, and
means responsive to said detecting means for resetting said timers when other than said preselected relationship is detected.

8. The system of claim 6 in which said detecting means comprises a logic gate with two inputs respectively coupled to the outputs of said pair of cycle timers, respectively, and an output coupled to reset inputs of each of said cycle timers.

9. The system of claim 6 in which said preselected relationship exists when the pair of timers are in opposite states.

10. In an environmental control system having apparatus for conditioning the air within an environmentally controlled space, an improved time controller of the apparatus, comprising:
a pair of cycle timers;
means for complementarily varying the duty cycles of both of said timers with a single control;
means for actuation the apparatus during a preselected portion of the cycle of one of said timers; and
a pair of counters respectively triggered by said pair of timers to enlarge the cycle periods associated therewith.

11. In an environmental control system having apparatus for conditioning the air within an environmentally controlled space, an improved time controller of the apparatus, comprising:
a pair of cycle timers;
means for complementarily varying the duty cycles of both of said timers with a single control, said single control included a potentiometer resistor symetrically connected with both of said timers; and
means for actuating the apparatus during a preselected portion of the cycle of one of said timers.

12. In an environmental control system having apparatus for conditioning the air within an environmentally controlled space, an improved time controller of the apparatus comprising:
a pair of cycle timers;
means for complementarily varying the duty cycles of both of said timers with a single control, said single control including a potentiometer resistor symetrically connected with both of said timers and a pair of substantially equal compacitors connected with opposite sides of said potentiometer resistor and to said pair of timers, respectively; and
means for actuating the apparatus during a preselectd portion of the cycle of one of said timers.

* * * * *